Nov. 18, 1924.  1,516,280
F. E. HODDERSEN-BALLING
HAM COOKER
Filed Feb. 1, 1922
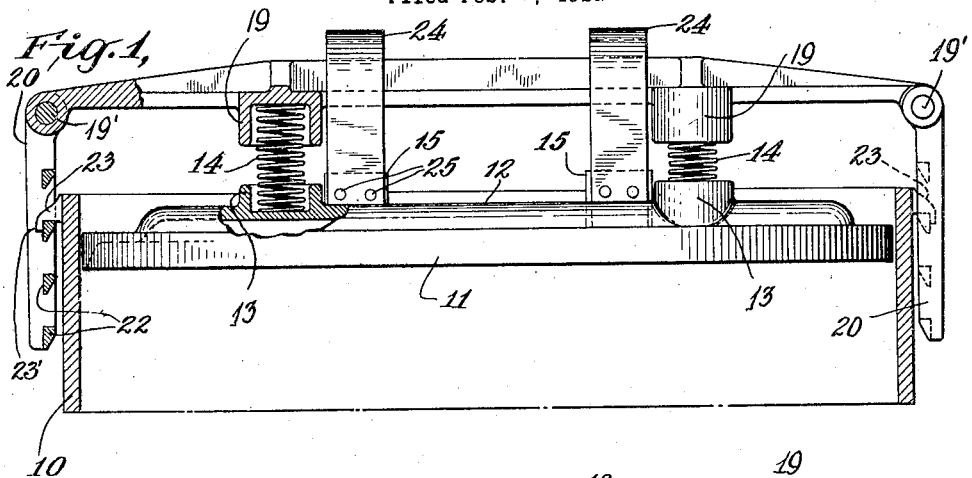
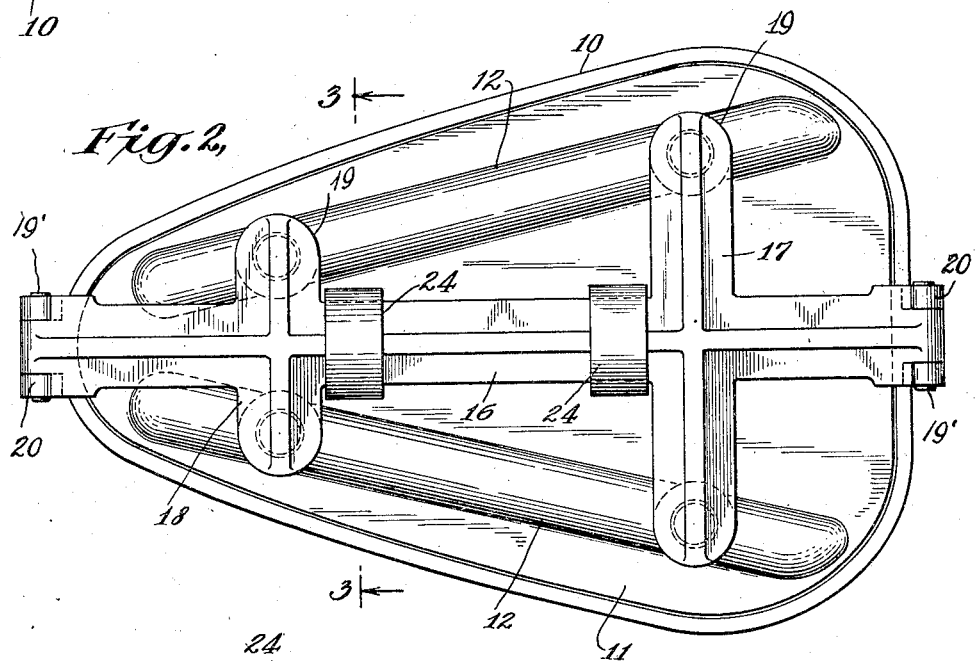
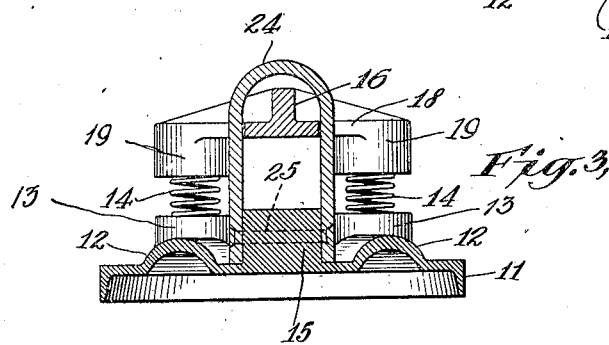
INVENTOR
F. E. Hoddersen-Balling
BY
Geo. W. Beeler
ATTORNEY Patented Nov. 18, 1924.

1,516,280

UNITED STATES PATENT OFFICE.

FREDERICK EDWARD HODDERSEN-BALLING, OF BROOKLYN, NEW YORK.

HAM COOKER.

Application filed February 1, 1922. Serial No. 533,284.

*To all whom it may concern:*

Be it known that I, FREDERICK EDWARD HODDERSEN-BALLING, a citizen of the United States, residing at New York city, borough of Brooklyn, in the county of Kings and State of New York, have invented certain new and useful Improvements in Ham Cookers, of which the following is a specification.

This invention relates to ham cookers or the like, an object of the invention being to provide improved means for connecting the handle bar and the cover proper, and also to provide improved quickly operating fastening means for locking the cover to the receptacle or body.

Other objects of this invention will appear in the following description and the appended claims, reference being had to the accompanying drawings, in which like reference characters designate the same parts in the several views, and in which—

Figure 1 is a side elevation showing particularly the new construction of the cover mechanism and with parts in section.

Fig. 2 is a plan view of the same.

Fig. 3 is a vertical transverse section on the line 3—3 of Fig. 2.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Referring now more specifically to the drawings a receptacle 10 is provided which may be of any suitable construction or design, and within the otherwise open top thereof is shown nested the cover 11 which has telescopic connection with the receptacle and through which the ham or other piece of meat is adapted to be first pressed into shape and then cooked in a manner well understood. The main part of the cover is flat, but is preferably provided with ribs 12 to stiffen or strengthen the same and also to provide tubular recesses or seats 13 for a plurality of springs 14, shown as two in number adjacent to each end of the cover and extending upward from said seats. The springs however are preferably not secured to the cover except as hereinafter set forth.

At about the center of each end portion of the cover and hence adjacent to the cross line connection between the two spring seats thereof is formed a lug 15, as by casting as an integral part of the cover. The two lugs 15, moreover, are arranged in longitudinal alignment with the vertical central plane of the cover.

A handle bar 16 extends above the cover, preferably parallel therewith and lengthwise thereof, the length of the bar being somewhat greater than the length of the cover. Formed on or secured to the handle bar 16 are a pair of cross bars 17 and 18 of different lengths and extending transversely or at right angles to the bar and carrying depending tubular receptacles or thimbles 19 forming housing members or seats for the upper ends of the aforesaid springs and in which seats the upper ends of the springs are normally loosely fitted. The central portion of the handle bar, midway between the cross bars 17 and 18, constitutes a hand grip for manipulating the cover or both the cover and receptacle when interlocked.

Hung upon horizontal pivots 19' at the ends of the bar 16 are locking hasps 20, each comprising a pair of spaced parallel vertical side bars 21 between which extend a series of rungs 22 preferably cast integral with the side bars 21. Each of these rungs is formed with a flat level upper surface and a lower surface that is beveled to facilitate the engagement of the hasp with a spur 23 carried by or formed on the adjacent end of the receptacle, said spur being provided with a downwardly projecting point 23' spaced outward from the body of the receptacle. The beveling of the lower portions of the rungs facilitates the movement of the hasp over the spur, and when the hasp is made to engage with one of its rungs beneath the spur the interlocking engagement between the hasp and body is positive and secure, and the two are not liable to become accidentally disconnected.

After the ham or other piece of meat is prepared for the purpose and introduced into the receptacle the cover is put in place as shown, and then the operator bearing downward upon the ends of the handle bar will by movement of his fingers manipulate the hasps to cause engagement with the respective spurs. This compression or depression of the handle bar being against the force of the springs 14 above described, the cover will be held upon the top of the meat with a corresponding resilient contact, so that the cover 11 will follow the form of the top of the meat during any shrinkage thereof incident to the cooking action.

It will be noted that the handle bar 16 is of such length as to overlie the ends of the receptacle with the pivots 19' in vertical alinement with the spurs 23, so that when the cover is placed in position and the handle bar pressed down for adjustment the rungs or catches 22 of the hasps 20 will successively slide over the ends of the spurs 23 and automatically lock the handle bar without having to use the hand, thus greatly facilitating the manipulation thereof.

From the nature of the springs which act under compression between the handle bar and cover it is important that effective means be provided for connecting the handle bar to the cover so as not to interfere with the action of the springs but at the same time to permit the cover to be withdrawn from the receptacle. To this end I provide a pair of inverted U-shaped keepers 24, each of which embraces the handle bar adjacent to a cross bar 17 or 18 and is fixed to opposite sides of the adjacent lug 15, as by means of screws or rivets 25. The bent portions of these keepers lie normally over the top of the handle bar when the cover is detached from the receptacle and at which time the cover is under little or no compression. The keepers moreover are strong and rigid, and the leg portions thereof being vertical and parallel and in fairly close contact with the sides of the handle bar, the handle bar is held from any substantial lateral or endwise movement. The endwise movement is prevented by contact between the keepers and the cross bars. The space between the keepers afford ample room for the operator to grasp the handle bar 16 and manipulate the device thereby.

I have found in practice that frequently when the handle bar is pressed down, the tendency thereof is to oscillate, particularly where one of the hasps 20 is adjusted in position prior to the adjustment of the other hasp, the operator in order to effect this adjustment first pressing down somewhat more on one end of the handle bar than the other end. It will be seen that the U-shaped keepers 24 freely embrace the handle bar, and will permit the necessary oscillatory as well as vertical movements of the handle bar, and without any binding of the parts. The position of the members 24 in juxtaposition to the cross bars 17 and 18 however, is such as to prevent any considerable or substantial endwise movement of the cross bar, although permitting sufficient oscillatory movement to enable the operator to manipulate the device readily and easily.

It is to be understood that by describing in detail herein any particular form, structure, or arrangement, it is not intended to limit the invention beyond the terms of the several claims or the requirements of the prior art.

I claim:

1. A device of the class described comprising the combination with a receptacle and a cover cooperating therewith, of means for securing the cover to the receptacle including a bar extending over the cover and spaced normally therefrom, spring means between the bar and the cover affording relative movement therebetween, means for connecting the bar to the receptacle, and keeper means surrounding said bar and fixed to the cover for limiting the upward movement of the bar relatively to the cover, said bar being provided with cross bars adjacent to the end portions thereof, and said keeper means comprising a pair of U-shaped members having engagement respectively with said cross bars.

2. In a cooker, the combination of a receptacle and its cover, a handle bar adapted to connect the cover to the receptacle, and keeper means for permitting vertical and oscillatory movement of the handle bar relatively to the cover.

3. In mechanism of the class set forth the combination of a receptacle and its cover, a handle bar to attach the cover to the receptacle, and keeper means for limiting the relative movement vertically of the handle bar from the cover, said keeper means comprising a pair of U-shaped members looped around the handle bar and spaced from each other thereby serving to hold the handle bar from lateral movement.

4. In a ham boiler having a receptacle and cover, a bar extending over the cover, a hasp pivoted to one end of the bar and comprising a pair of parallel side bars and a series of transverse rungs connected to said bars and spaced from one another, and a downwardly turned spur fixed to the adjacent end of the receptacle for cooperation with any selected rung of said hasp.

5. A cooker comprising a receptacle, a cover therefor, a handle bar for manipulating said cover, a cross bar connected to said handle bar and having hollow spring receiving seats adjacent to the ends thereof, and springs extending into said seats and engaging the cover.

6. A cooker comprising a receptacle, a cover therefor, a handle bar for manipulating said cover, a cross bar connected to said handle bar and having hollow spring receiving seats adjacent to the ends thereof and springs extending loosely into said seats and engaging the cover, and means embracing said handle bar at one side of said cross bar for interconnecting the bar and cover.

7. In a cooker, the combination of a receptacle, a cover therefor, a handle bar for manipulating the cover, and a U-shaped member connected to the cover and embracing said handle bar so as to guide said bar in its movements relatively to the cover and permit oscillatory as well as vertical movements of the bar.

8. A cooker comprising a receptacle, a cover therefor, a handle bar for manipulating the cover, cross members connected to said handle bar, and a pair of means for connecting said handle bar and cover and adapted to permit vertical and oscillatory movements of the handle bar relatively to the cover.

In testimony whereof I affix my signature.

FREDERICK EDWARD HODDERSEN-BALLING.